United States Patent [19]

Sandolo

[11] Patent Number: 5,603,458
[45] Date of Patent: Feb. 18, 1997

[54] COFFEE BLENDING APPARATUS

[76] Inventor: Raffael Sandolo, 226 Thayer Pond Rd., Wilton, Conn. 06897

[21] Appl. No.: 437,176

[22] Filed: May 8, 1995

[51] Int. Cl.$^6$ .................................................. B02C 19/12
[52] U.S. Cl. ............................ 241/34; 241/100; 241/101.6
[58] Field of Search ............................... 241/100, 101.6, 241/101.8, 34

[56] References Cited

U.S. PATENT DOCUMENTS

| | | | |
|---|---|---|---|
| 3,182,919 | 5/1965 | Geerlings | 241/101.6 |
| 4,971,259 | 11/1990 | Nidiffer | 241/34 |
| 5,277,869 | 1/1994 | Glazer et al. | 241/606 X |
| 5,280,859 | 1/1994 | Rust et al. | 241/101.6 |
| 5,458,295 | 10/1995 | Haber et al. | 241/100 |
| 5,462,236 | 10/1995 | Knepler | 241/34 |
| 5,522,556 | 6/1996 | Knepler et al. | 241/34 |

*Primary Examiner*—John M. Husar
*Attorney, Agent, or Firm*—Fattibene and Fattibene; Arthur T. Fattibene; Paul A. Fattibene

[57] ABSTRACT

A blending or mixing apparatus and method and more particularly to a coffee blending apparatus for automatically blending two or more types of coffee beans that weighs and packages the blended coffee into containers either as a ground blend or as a coffee bean blend to be ground at a later time by the purchaser. The apparatus includes two or more hoppers, each containing a particular type of coffee bean disposed above a weighing apparatus or scale whereby each hopper is automatically controlled by a valve for releasing a predetermined amount of coffee onto the scale or weighing apparatus. When a predetermined amount of coffee beans making up the desired blend are weighed, the blend of coffee beans are directed to either a grinder or a bagging station for packaging. If directed to the grinder, the ground coffee blend is subsequently directed to a bagging station. The operative valves controlling the discharge of the respective predetermined amount of coffee beans onto the weigher are controlled by a computer, which received the individual purchaser's input for individual customizing to the purchaser's desired blend, and which blend is unique to that particular customer.

7 Claims, 3 Drawing Sheets

COFFEE BLENDING APPARATUS

FIELD OF THE INVENTION

This invention relates to blending apparatus, and more particularly to a coffee blending apparatus whereby the individual purchaser may custom-blend coffee to the purchaser's individual taste, and whereby the customer may repeatedly make the same blend, and a method for customized blending.

PRIOR ART

Drinking of coffee has been, for a long time, a favorite beverage for many people. Coffee is grown in many parts of the world, and each such coffee has its own particular taste, flavor and smell. Such coffees have over time been combined by the major coffee manufacturers and coffee roasters into commercial blends. Such blends have been marketed by the major coffee manufacturers as predetermined by the mass producer of such coffee. In view of the vast popularity of coffee, many coffee drinkers have developed a desire for tastes and blends that are not generally commercially available.

An object of this invention is to provide an apparatus and method whereby an individual purchaser may select his or her own personal blend.

Another object is to provide an apparatus and method whereby an individual purchaser may customize his or her personal blend or vary the blend as the customer may desire.

Another object is to provide a coffee blending apparatus by which the customer may customize his or her own blend and which blend formula can be readily stored in a memory bank or data base that can be recalled by the customer at some later time.

SUMMARY OF THE INVENTION

The foregoing objects and other features and advantages can be attained by a blending apparatus that comprises two or more hoppers, each containing a supply of coffee beans grown in various coffee producing areas. Each hopper is provided with an outlet that is controlled by a valve or damper actuated in a predetermined manner or sequence for releasing only that desired amount of a particular coffee bean required by the particular blend customized by the individual purchaser. The respective hoppers are arranged to discharge the predetermined amount of coffee beans into a collector which includes a weighing apparatus or scale to weigh the mixture or blend of the coffee beans released from the respective hoppers. Upon weighing, the mix or blend of coffee beans is directed to a grinder where the beans may be ground and subsequently bagged in a suitable bag or container. Alternatively, the mixed beans or blend can be directed to a bagging station where the beans are directly bagged. In accordance with this invention, the apparatus described is controlled by a central process unit (CPU) for controlling the actuation of the valves releasing the desired amount of coffee from the respective hoppers and for controlling the sequence of operation whereby the individual customer may make his or her personal blend according to his or her personal taste automatically. In one form of the invention, a suitable printer may be operatively connected to the CPU to print a label which identified the formula of the particular coffee blend designed by the purchaser, and which the purchaser may apply to the bagged, blended mix. The CPU program also includes a memory to form a data base of all the customers utilizing the apparatus, whereby a given customer may repeatedly reformulate his or her own personal blend by inputting the appropriate code into the CPU.

In another form of the invention, the respective hoppers are pressurized to maintain the coffee beans under pressure within their respective hoppers.

IN THE DRAWINGS

DETAILED DESCRIPTION

Figure 1:
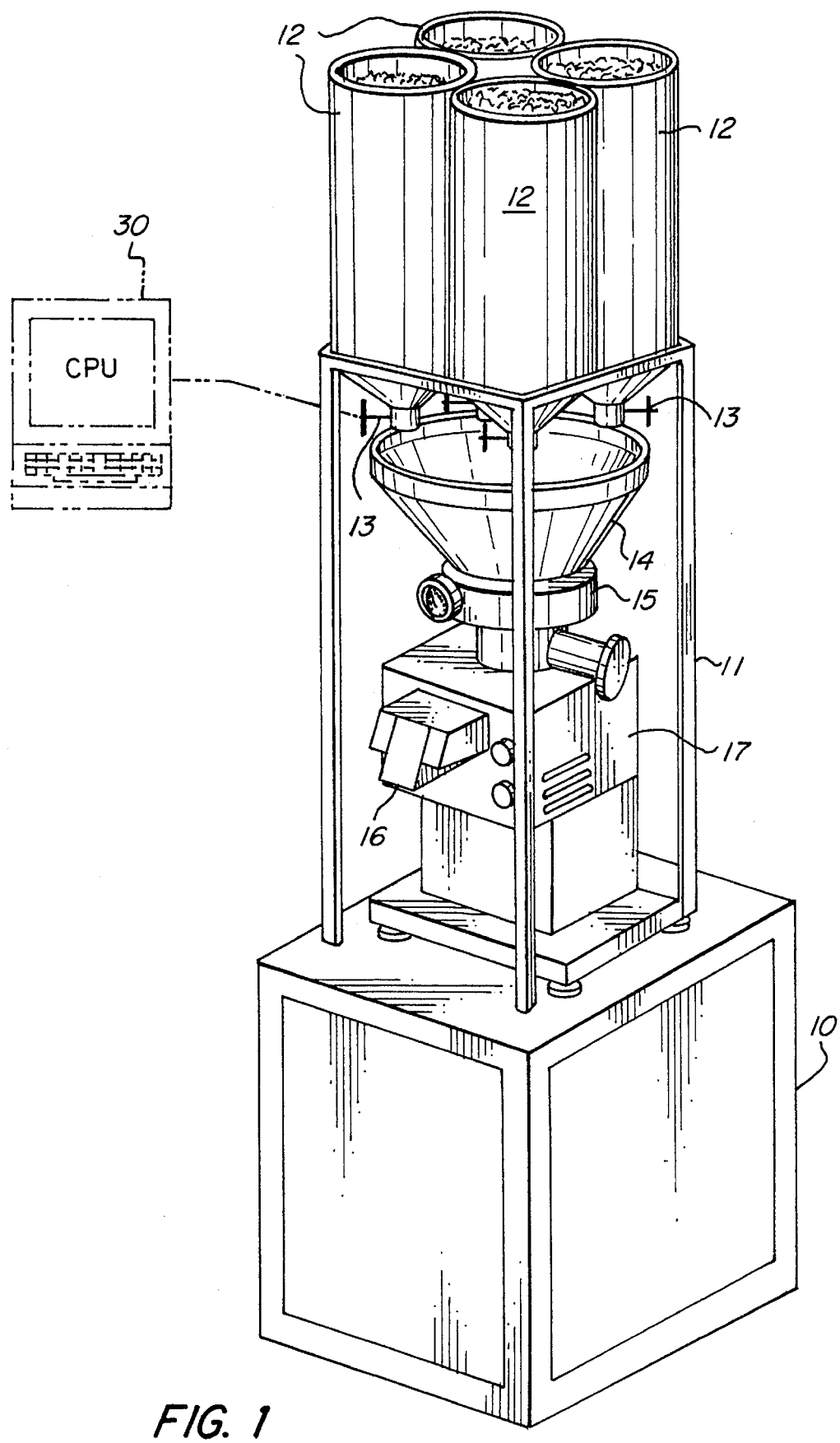
FIG. 1 is a perspective view of one form of the invention.

Referring to the drawings, FIG. 1 illustrates an embodiment of the invention that includes a support or base 10 having a superstructure or frame 11 for supporting thereon a plurality of hoppers 12. Each hopper 12 is designed to contain a supply of a particular type of coffee bean, e.g. Columbian coffee bean, India coffee bean, Jamaican coffee bean and such other type of coffee beans that are native to the various coffee producing countries or areas. In the illustrated embodiment, four such hoppers 12 are illustrated. However, it will be understood that more than four hoppers can be provided as will be hereinafter described. Each hopper 12 at its discharge opening is controlled by a valve 13 which is operatively connected in circuit to CPU unit 30.

As seen in FIG. 1, the hoppers 12 are clustered and are disposed above a collector 14 in the form of a funnel or hopper connected to a weighing apparatus or scale 15 that will weigh the mixture or blend of coffee beans discharged from the respective hoppers upon the actuation of the selected valves 13 controlling the discharge opening of the respective hoppers 12.

When the coffee bean mix has been weighed, the scale will direct the blend of coffee beans directly to either a grinder 17 or to a bagging station located at 16. In the illustrated embodiment of FIG. 1, the coffee grinder 17 is located beneath the scale or weighing apparatus 15. The weighing apparatus or scale 15 may be provided with a suitable valved bottom for discharging the weighed coffee bean mixture directly to the bagging station 16 or optionally to the grinder 17. After grinding, the ground coffee mix is directed to the bagging station 16.

In operation, the customer will make his or her selection of the specific coffee beans desired for making up the individualized custom blend by making the proper selection on the CPU 30. The customer also inputs the percentages of each selected coffee by weight. Upon inputting the customer's individual customized blend or formula into the CPU 30, the valves controlling the discharged openings of the selected coffee hoppers are individually actuated, allowing the selected amount of each type of coffee bean to be discharged onto the weighing scale where the amount of the blend is automatically weighed and priced.

After weighing, the scale valve is actuated for directing the weighed blend or mix of coffee beans to either a grinder 17 or a bagging station 16 as directed by the customer. If the customer elects grinding, the beans making up the coffee blend are ground and thereafter directed to the bagging station 16 for bagging.

Figure 2:
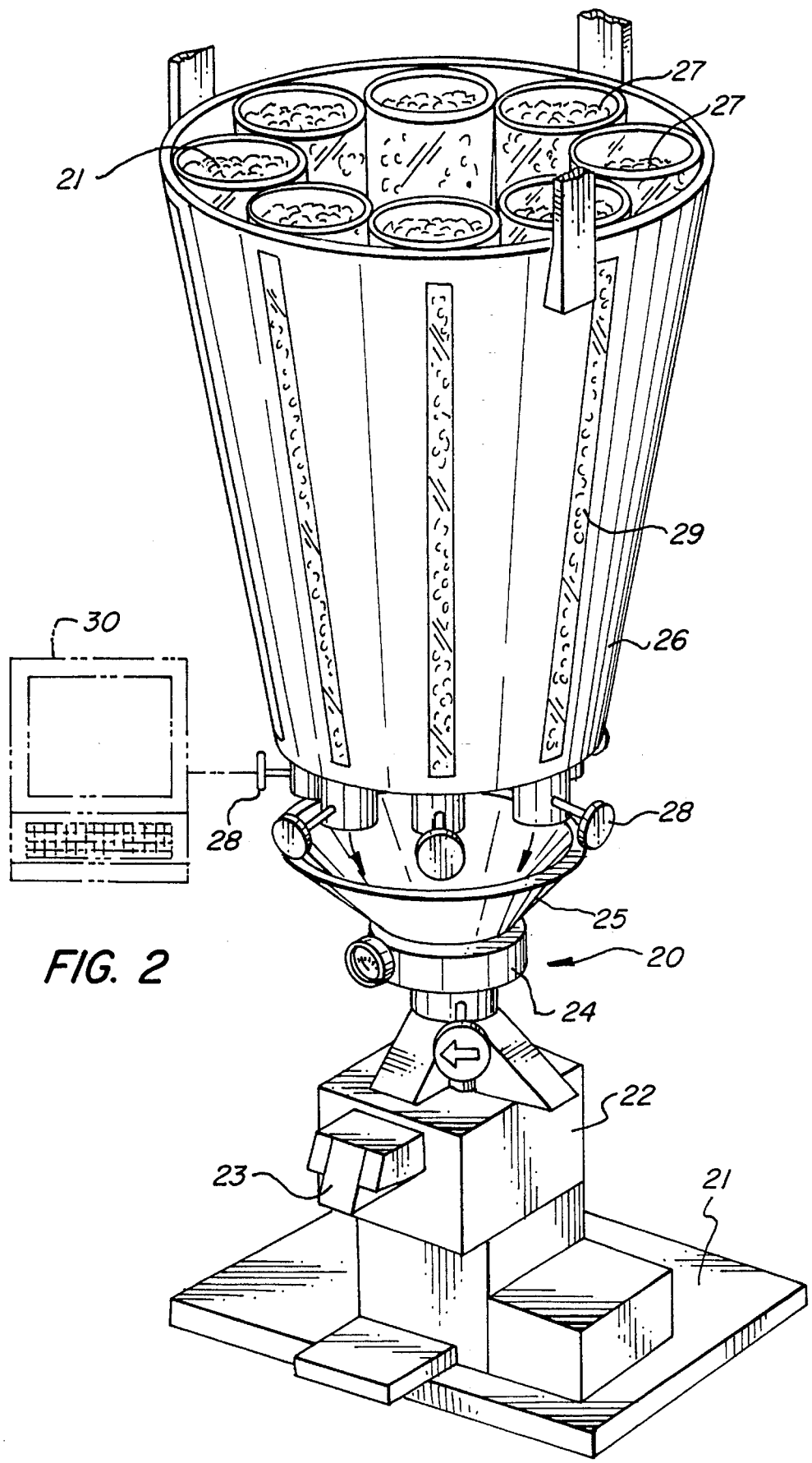
FIG. 2 is a perspective view of a modified form of the invention.

FIG. 2 illustrates another form of the invention. In this form of the invention, the blending apparatus 20 includes a base 21 on which there is supported a grinder 22 that includes a bagging station 23. Mounted above the grinder 22 is a weighing station or scale 24 which includes a hopper or funnel 25 forming a collector for receiving the various coffee beans selected by the customer.

The scale 24 includes a bottom opening which is controlled by a valve or damper which allows the coffee bean mix being weighed to release to the grinder 22 and/or bagging station 23 as hereinafter described.

Above the weighing station or scale 24, there is provided a main hopper 26 which has disposed therein a plurality of individual hoppers 27 circumferentially spaced about the interior of the main hopper 26. Each of the respective individual hoppers 27 contain a supply of different types of coffee beans which are grown in the various coffee producing countries. As hereinbefore described, each individual hopper 27 is provided with a bottom discharge opening controlled by an electrically actuated valve 28. The respective valves 28 are actuated by the output signal from a CPU 30. An output signal of the CPU also controls the actuation of the scale valve member. In order to visually determine the amount of bean supply in each of the respective hoppers 27, there is provided a sight opening 29. The sight opening 29 may comprise an elongated slot circumferentially spaced about the main hopper 26. The respective slots 29 are aligned with a corresponding glass or transparent sight formed in each of the respective individual hoppers 27. The arrangement is such that the amount of the coffee supply in each of the respective individual hoppers 27 can be visibly observed. In operation, this form of the invention is similar to that described with respect to the described embodiment of FIG. 1.

Figure 3:
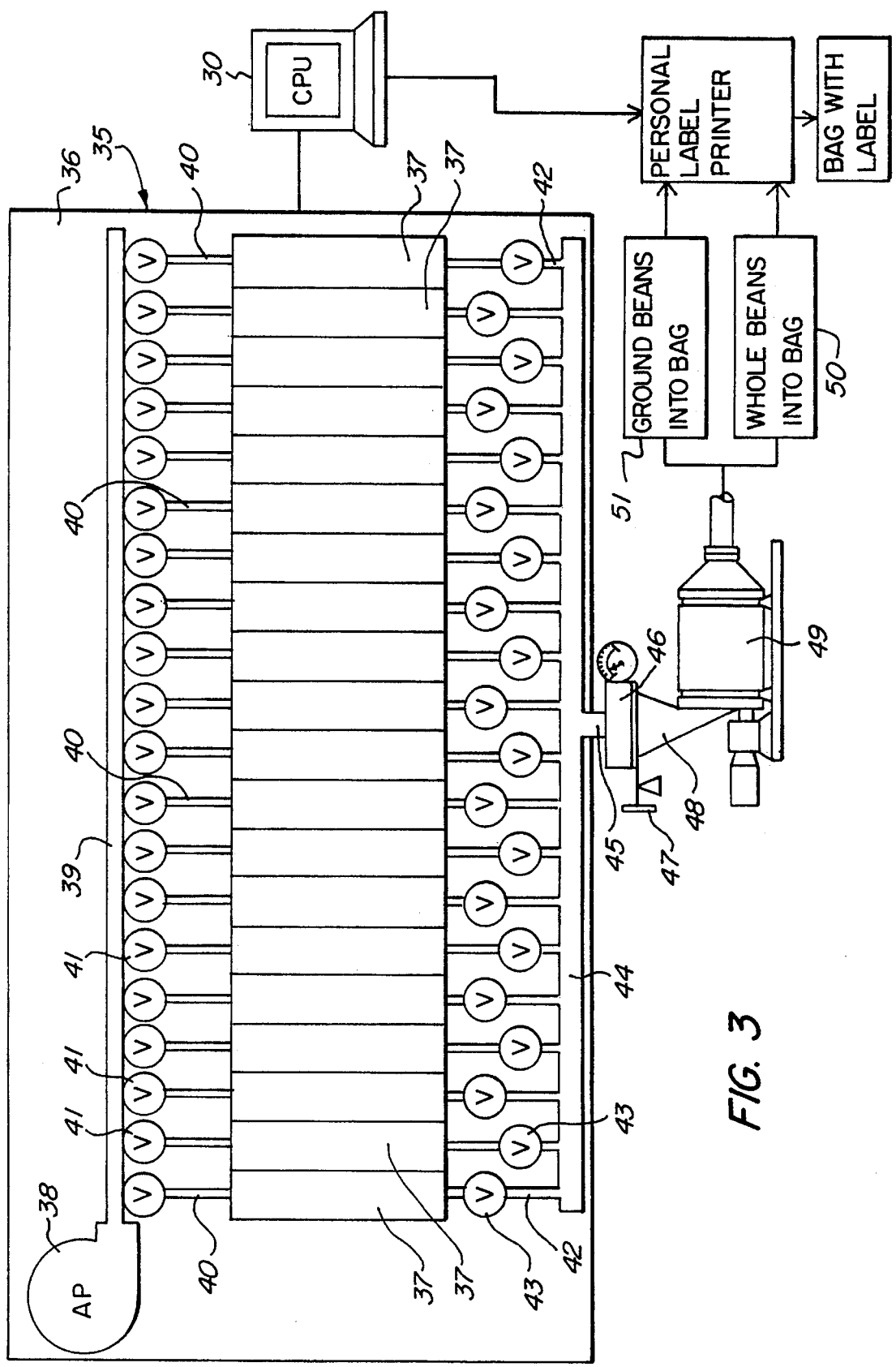
FIG. 3 is a diagrammatic view of another form of the invention.

FIG. 3 illustrates a further embodiment of the invention. In this form, the apparatus 35 comprises a panel 36 having mounted thereon a plurality of hoppers or chambers 37 for containing a supply of a particular type of coffee bean. As illustrated, the number of hoppers or chambers 37 may vary, depending upon the number of different types of coffee a particular store owner may wish to display. In this form of the invention, each of the respective hoppers or chambers 37 for containing a supply of coffee is pressurized. As shown, this is attained by an air pump or compressor 38 generating a fluid pressure, e.g. air pressure which is directed to a main manifold 39. The manifold 39 in turn is connected to a plurality of inlet branches 40. Each of the respective inlet branches 40 connects the manifold in communication with the interior of its corresponding chamber 37. Interconnected in each branch 40 is an electrically operated valve 41, interposed between the manifold 39 and the associated chamber for controlling the pressure on each hopper or chamber 37.

Connected to the bottom of each hopper or chamber is an outlet branch 42, each branch 42 including a valve 43. Each of the respective outlet branches 42 connects its corresponding hopper or coffee supply chamber 37 to a common outlet manifold 44.

Intermediate the ends of the outlet manifold 44 is a discharge opening 45 whereby the coffee beans being discharged from the respective hoppers or suppliers 37 are emptied onto a weighing device, e.g. an electronic scale 46. The bottom of the scale 46 is provided with an opening that is valved by a valve 47. Upon opening of the scale discharge opening, the weighed or mixed coffee beans are directed to a hopper 48 that discharges the blended coffee bean to a rotary mixer 49.

From the rotary mixer 49, the coffee beans may be optionally directed to a bagging station 50 or to a grinding station 51 after which the ground beans are suitably bagged. The bagged coffee, whether bagged as beans or as a grind, are directed to a printing station whereby the label containing the formula of the coffee blend is printed either directly onto the bag or upon a label which is attached to the bag. Bag as used herein includes a conventional coffee type bag, or tin or container of any suitable type in which the coffee is packaged.

It will be understood that the CPU 30 is programmed so that when a customer puts in the formula of a particular blend which the customer desires, the appropriate valves 41 and 43 are actuated to provide for a pressurized, controlled discharge of the particular coffee beans controlled by the respective valves. The program further defines the sequence and timing of the specific operations required to select the amount and kind of coffee beans making up the blend, the weighing of the amount of the blend desired, the mixing, grinding, bagging and printing in a predetermined automatic manner.

In accordance with this invention, it will be apparent that a coffee aficionado may customize his or her own blend from a variety of predetermined numbers of differing coffee beans in a self-service and automatic manner. The CPU program includes a memory whereby each customer's personal blend is recorded in a data base, so that the customer may reorder his individual customized coffee blend simply by inputting his personalized code into the CPU.

While the invention has been described in reference to the personal custom blending of coffee beans, it will be understood that the invention can be applied to the customized mixing of other ingredients, e.g. nuts, candy, cookies, cereals and other ingredients which a purchaser may buy in a customized variety package. With the present invention, a purchaser need not be limited to variety packaged goods which are predetermined by the manufacturer of such goods. The present invention provides for a readily simple and expedient manner by which the purchaser may personally customize and/or individually blend a mixture of like or unlike ingredients in an automatic manner to form his or her own personalized variety or blended package of a particular goods.

While the present invention has been described with respect to various embodiments, various modifications may be made without departing from the spirit and scope of this invention.

What is claimed is:

1. An apparatus for personalizing and custom blending a mixture of several different types of coffees comprising:

a plurality of supply hoppers, each of said supply hoppers defining a supply source for each of the different coffees from which a selection can be made, each of said hoppers having a discharge opening, a hopper discharge valve for valving the discharge opening of the respective hoppers between an opened and closed position, a scale disposed adjacent the discharge openings of the respective hoppers for receiving the contents of the respective hoppers when said hopper discharge valves are actuated, said scale having a discharge opening, and a scale valve for valving said scale discharge opening, a bagging station connected in communication with said scale opening so that upon actuation of said scale valve, the contents being weighed by the scale are directed to said bagging station, and a central processing unit, said central processing unit being programmed to sequence the actuation of said valve means for controlling the amount and type of coffee discharged from the respective hoppers to be mixed in accordance with a predetermined selection.

2. An apparatus as defined in claim 1 and including a grinder disposed in communication with said scale discharge opening, and a selecting means for optionally directing the coffees being weighed to either the bagging station or the grinding station.

3. An apparatus as defined in claim 1 and including a main hopper, and said plurality of supply hoppers being disposed within said main hopper, and sight means for visibly observing the amount of coffee remaining in each of said supply hoppers.

4. An apparatus for personalizing and custom blending coffee selected from coffee beans that are native to and grown in various coffee producing areas about the world comprising:

a plurality of supply hoppers, each of said supply hoppers adapted to contain a supply of a particular coffee bean native to a particular coffee growing region, each of said supply hoppers having a discharge opening, means for pressurizing each of said hoppers with a fluid pressure, said hoppers each having a discharge opening, a discharge manifold, a branch conduit connecting the discharge opening of each of said hoppers in communication with said discharge manifold, a valve interposed in each of said branch conduits for controlling the amount of coffee beans to be dispensed from its corresponding hopper, said discharge manifold having a discharge opening, a scale disposed adjacent said manifold discharge opening for collecting and weighing the coffee beans dispensed from the respective hoppers, said scale having an opening, and a scale valve for valving said scale opening between an open and closed position, a mixer disposed in communication with said scale opening for receiving the weighed coffee beans, said mixer having a discharge opening through which the coffee beans are discharged after being mixed, and a CPU programmed to control the actuation of the respective valve so as to effect the release of the amount and type of coffee bean from the respective hoppers in accordance with the selection made by the purchaser.

5. An apparatus as defined in claim 4 and including a grinding and bagging station downstream wise from said mixer.

6. An apparatus as defined in claim 8 and including a printer connected to said CPU for printing a label containing the formula of the coffee blend selected by the purchaser.

7. An apparatus for personalizing and custom blending a mixture of several different coffees grown in various coffee producing countries comprising:

a plurality of hoppers, each hopper being adapted to contain a supply of a particular coffee bean, means for pressurizing each of said hoppers, each of said hoppers having a discharge opening, valve means for controlling the opening and closing of the discharge opening of each of said hoppers, a collecting manifold connected in communication with each of said hoppers for receiving the selected coffee beans, said collecting manifold having a discharge opening, a scale disposed adjacent said manifold discharge opening for receiving the selected coffee beans from said manifold for weighing, said scale having a bottom opening, a scale valve for valving said bottom opening between an open and closed position, a chute for receiving the selected coffee beans where said scale valve is actuated to an open position, a mixer, said chute directing the selected coffee beans to said mixer, a CPU for activating said valve means, said CPU being programmed for actuating said valve means to control the amount and type of coffee bean dispensed from the selected hopper in response to a consumer's input, a bagging station adjacent the outlet end of said mixer, and printer operatively connected to said CPU for printing a label containing the amount and type of each different coffee bean comprising the resulting blend, said CPU having a memory for storing the various individualized blends selected on said apparatus.

* * * * *